United States Patent [19]

Stark

[11] Patent Number: 4,597,412
[45] Date of Patent: Jul. 1, 1986

[54] VALVE FOR SEQUENTIAL CHEMICAL OPERATIONS

[76] Inventor: Anton W. Stark, 2001 E. Galbreth Rd., Pasadena, Calif. 91104

[21] Appl. No.: 693,690

[22] Filed: Jan. 23, 1985

Related U.S. Application Data

[63] Continuation of Ser. No. 426,809, Sep. 29, 1982, abandoned.

[51] Int. Cl.⁴ .............................................. F16K 19/00
[52] U.S. Cl. ...................................... 137/606; 251/331
[58] Field of Search ................ 137/606, 883; 251/331

[56] References Cited

U.S. PATENT DOCUMENTS

| | | | |
|---|---|---|---|
| 3,019,815 | 2/1962 | Lenardon | 251/331 X |
| 3,613,729 | 10/1971 | Dora | 251/331 X |
| 3,951,167 | 4/1976 | Howell | 251/331 X |
| 4,008,736 | 2/1977 | Wittman | 137/606 |
| 4,168,724 | 9/1979 | Graffunder | 137/606 |
| 4,304,257 | 12/1981 | Webster | 251/331 X |

Primary Examiner—Robert G. Nilson
Attorney, Agent, or Firm—Louis J. Bachand

[57] ABSTRACT

A valve for multiple sequential operations such as biosynthesis, in which the valve body has a longitudinal groove as a common passage for a longitudinal sequence of local ports, and a unitary diaphragm controlled by a plurality of solenoid operable plungers opens and closes the local ports to the common passage by blocking fluid flow across the lands intervening between the local ports and the common passage.

22 Claims, 7 Drawing Figures

VALVE FOR SEQUENTIAL CHEMICAL OPERATIONS

This application is a continuation, of application Ser. No. 426,809, filed 09/29/82 now abandoned.

TECHNICAL FIELD

This invention has to do with valves, and more particularly with valves useful in chemical synthesis, particularly biosynthesis, for controlling the sequence of passage of chemical reagents to a reaction vessel, in precise quantity, and without cross-contamination or reagent loss. The present valve apparatus is readily fabricated with precision from conventional materials, has no unusually angled passages, is self-contained as to both valve elements and valve actuators, and is more compact, easier to set up and operate than previously known devices of this kind to which it is in all ways superior.

Primarily the present invention obsoletes valve systems in which a sequence of separate passages are connectible with a common passage comprising a sawtooth sequence of segments drilled at an angle into a valve body. Such valve blocks have elliptical apertures at the intersection of the meeting passages with the valving surface, the assymetric nature of which makes sealing more difficult than a simple circle would be, and which unduly wears the valve diaphragm. There is further in such apparatus a sharp radius at the locus of intersection of the passages, and necessarily a reduction in the cross-section of the passage at the point of the intersection. These problems are avoided in the present apparatus wherein all drilling of passages is at 90° to the valve body wall, and the common passage is full bore throughout its length. Moreover, the opening into the supply passages is circular, enabling better sealing and less wear on the sealing medium. Other and additional advantages will become apparent as the description proceeds.

While broadly useful wherever precise valve control of a multiplicity of fluids to be used in a progressive or random sequence in a common vessel at the downstream end of the valve, such as degradations and syntheses of proteinaceous matter, the invention apparatus is particularly useful for the performance of degradative and synthetic chemical processes and will be specifically described in an embodiment relating to its use as a component in apparatus for automatically performing the sequential degradation of protein or peptide chains containing a large number of amino acid units for purposes of determining the sequence of those units.

The linear sequence of the amino acid units in proteins and peptides is of considerable interest as an aid to understanding their biological functions and ultimately synthesizing compounds performing the same functions. A variety of techniques have been used to determine the linear order of amino acids, such as those described in the following publications:

Edman and Begg, "A Protein Sequenator," European J. Biochem. 1 (1967) 80–91; Wittman-Liebold, "Amino Acid Sequence Studies of Ten Ribosomal Proteins of Escherichia coli with an Imroved Sequenator Equipped with an Automatic Conversion Device," Hoppe-Seyler's Z. Physiol. Chem. 354, 1415 (1973); Wittmann-Liebold et al., "A Device Coupled to a Modified Sequenator for the Automated Conversion of Anilinothiazolinones into PTH Amino Acids", Analytical Biochemistry 75,621 (1976); U.S. Pat. No. 3,959,307 issued to Wittmann-Liebold and Graffunder on May 25, 1976, for "Method to Determine Automatically the Sequence of Amino Acids;" Hunkapiller and Hood, "Direct Microsequence Analysis of Polypeptides Using an Improved Sequenator, A Nonprotein Carrier (Polybrene), and High Pressure Liquid Chromatography," Biochemistry 2124 (1978); Laursen, R. A. Eur. J. Biochem. 20 (1971); Wachter, E., Machleidt, H., Hofner, H., and Otto, J., FEBS Lett. 35, 97 (1973); U.S. Pat. No. 3,725,010 issued to Penhasi on Apr. 3, 1973, for "Apparatus for Automatically Performing Chemical Processes;" U.S. Pat. No. 3,717,436 issued to Penhasi et al. on Feb. 20, 1973, for "Process for the Sequential Degradation of Peptide Chains;" U.S. Pat. No. 3,892,531 issued to Gilbert on July 1, 1975, for "Apparatus for Sequencing Peptides and Proteins;" U.S. Pat. No. 4,065,412 issued to Dreyer on Dec. 27, 1977, for "Peptide or Protein Sequencing Method and Apparatus."

Briefly, the Edman sequential degradation processes involve three stages: coupling, cleavage and conversion. In the coupling stage phenylsothiocyanate reacts with the N-terminal alpha amino group of the peptide to form the phenylthiocarbamyl derivative. In the cleavage step anhydrous acid is used to cleave the phenylthiocarbamyl derivative to form the anilinothiazolinone. After extraction of the thiazolinone the residual peptide is ready for the next cycle of coupling and cleavage reactions. Aqueous acid is used to convert the thiazolinone to the phenylthiohydantoin which may be analyzed in an appropriate manner, such as by chromatography.

The reactions may be carried on in a thin film formed on the inside wall of a rotating reaction cell which is commonly known as a "spinning cup" and is located within a closed reaction chamber. Means are provided for introducing and removing controlled amounts of liquid reagents relative to the chamber for reaction with a sample of a protein of peptide in an inert atmosphere, such as the type of multiple fluid control valve of the present invention. The sample to be analyzed is initially placed in the spinning cup, followed by the sequential introduction and withdrawal of the various reagents and solvents necessary for carrying out the coupling and cleavage reactions. The liquid reagents and solvents themselves form films on the walls of the cup which pass over and interact with the sample film as the cup spins. The reagents dissolve the sample film and perform the coupling and cleavage stages, the reaction chamber is evacuated to remove volatile components of the reagents. Following the post-coupling evacuation, the remaining sample film is extracted from the sample film with solvent and transferred either to a separate flask for conducting the conversion step or to an apparatus for collection and drying of the various fractions. In cases where the conversion process is not performed immediately in a conversion flask, the process may be performed later on a number of fractions simultaneously.

The introduction and withdrawal of fluids relative to the spinning cup has been achieved with fluid conduits passing through a plug which seals an opening in the upper wall of the reaction chamber and depends therefrom to a location within the cup. Fluids are introduced directly into the spinning cup at a point adjacent the bottom thereof, and are withdrawn from an annular groove in the cylindrical interior surface of the cup. The fluid to be withdrawn is forced into the annular groove by centrifugal force when the cup is rotated at a high rate, and is withdrawn through a conduit having an inner end projecting into the groove. This effluent conduit thus acts as a scoop for removing the reaction products and by-products and the extracting solvents.

As will be evident, the biochemical processes contemplated to be run using the valve of the invention involve highly precise provision of proper amounts of reagents in a rapid, e.g. computer-controlled sequence. To be effective in these applications a valve must be positive sealing, as free as possible of unswept areas to avoid reagent deterioration and contamination or loss of sequence control, compact, reliable, and no more costly than necessary to achieve these objectives.

It is therefore an object of the invention to provide a valve apparatus effective for biosynthesis sequential reaction control. It is another object to provide such apparatus which has fluid passages of minimum length, is simply fabricated, readily cleaned, highly precise, and less costly than similar purpose valves.

These and other objects of the invention to become apparent hereinafter are realized in a valve apparatus for the sequential delivery of different fluids from a plurality of different fluid sources through a common passage to a predetermined destination such as a common vessel, the apparatus comprising a valve body having a valve seat-defining surface, and a separable valve body cover adapted to fluid tightly cover the surface; a plurality of separate passages through the valve body each communicating a valve body port beyond the valve seat surface with a local opening in the surface for delivery thereto of fluid from one of the different fluid sources; a groove in the valve seat surface extending longitudinally in the valve body to define the common passage, the groove being continuously upwardly open toward the valve cover in juxtaposed relation with each valve seat surface opening across a respective intervening land; and means controlling flow of fluid into the common passage from the separate passages, the fluid flow control means including a valve between the valve body and cover adapted to cooperate with the intervening lands in locally actuated relation to block or unblock flow from any or all of the separate passages to the common passage in any predetermined timed relation corresponding to a desired sequence of delivery of different fluids through the common passage.

In particular embodiments of the present valve apparatus; there is further included a fluid source supply to one or more of the valve body ports; the valve body defines a rectangular sealing surface and the valve body cover is generally congruent with and overlies the sealing surface; a valve body base is provided supporting the valve body, the base defining a plurality of inlets in registry with the valve body ports, and a series of perimetrically distributed fasteners fasten the cover to the base in valve body sealing relation; the separate passages are respectively adapted to pass liquid or gas inert or active fluids from a series of ports in one side of the valve body to the openings in a second side of the valve body relatively angularly disposed to the first side and defining the sealing surface; further included are means providing positive fluid pressure within a plurality of the separate passages tending to locally unseat the valve for fluid flow locally from one of the separate passages to the common passage, and individually actuable valve control means acting against the valve in local unseating blocking relation, the sequence of actuation of the valve control means determining the sequence of fluid flows to the common passage when a plurality of the separate passages are under positive fluid pressure, e.g. each valve control means comprises a solenoid operated plunger operative to seat the valve between a given separate passage and the common passage in seal maintaining relation against positive fluid pressure in the separate passage, the solenoid typically being carried by the cover and comprised of a cylindrical body having an outer wall, secured by means to the cover in rapidly removable relation, the last mentioned means typically comprising a cam element and cooperating structure on the solenoid body outer wall.

In particularly preferred embodiments: the valve comprises a unitary diaphragm overlying the groove and a plurality of the surface openings; there is provided a plurality of valve control means paired respectively with the plurality of surface openings, the valve diaphragm being locally responsive to individual ones of the valve control means in particular surface opening blocking and unblocking controlling relation and independently of the blocked or unblocked condition of others of the surface openings.

In the foregoing and like embodiments, the valve body is generally rectangular and has a planar valve seat-defining surface, and the sealing surface groove is free of surface-intersecting undulations throughout its juxtaposed length with the surface openings.

In a particularly preferred embodiment, the apparatus includes a valve body base comprising a block having a deep central recess adapted to snugly receive the valve body in shallow recess-defining relation, the base block defining a plurality of inlets to the valve body ports; the valve diaphragm is adapted to fill the shallow recess in simultaneous common passage and separate passage opening overlying relation; the cover is fastened to the base and blocked against the valve diaphragm, the cover being locally relieved opposite the surface openings in diaphragm-deflection permitting relation; and a plurality of solenoid operated plungers is provided independently operatively associated with the cover to control displacement of the valve diaphragm into the locally relieved portions of the cover, whereby fluid flow from a sealing surface opening past the valve diaphragm to the common passage is locally blocked or unblocked by separate operation of each the solenoid plunger in fluid flow sequence defining relation responsive to control of deflection of the diaphragm with respect to locally relieved portions of the cover.

In the foregoing embodiments preferably a pressurized fluid source supply is provided to one or more of the valve body ports, whereby the ports are continuously hydraulically full; the valve body is generally rectangular in longitudinal and transverse cross section, the sealing surface thereof being rectangular, the valve body cover is generally congruent with and overlies the sealing surface, the valve body base supports the valve body and a series of perimetrically distributed fasteners fasten the cover to the base in valve body sealing relation; the separate passages are respectively adapted to pass liquid or gas inert or active fluids from a series of the ports in one normally vertical side of the valve body to the openings in the normally upper horizontal side of the valve body; the pressurized fluid supply provides positive fluid pressure within the separate passages tending to locally unseat the valve diaphragm, each solenoid plunger being associated with a separate passage opening normally blocking displacement of the diaphragm local portion against the fluid supply pressure at the separate passage opening; and the solenoid plungers define individually actuable valve control means acting against the valve diaphragm in local unseating blocking relation, the sequence of actuation of the valve control means solely determining the sequence of fluid flows to the common passage when a plurality of the separate passages are under positive fluid pressure.

Typically in biosynthesis applications of the present apparatus, there is further provided means to purge the common passage of fluids including an inert fluid valve body inlet and outlet communicated by the common passage.

In a highly particularly preferred embodiment there is provided in accordance with the present invention valve apparatus for the sequential delivery of different fluids including multiple reagents from a plurality of different fluid sources under pressure through a common passage to a predetermined destination such as a common vessel, the apparatus comprising an axially elongated valve body rectangular in longitudinal and transverse cross-section and of a predetermined height, the valve body defining a normally upward facing, rectangular valve seat surface and a series of vertically disposed separate passages extending between respective longitudinally distributed pairs of valve body ports remote to the sealing surface and sealing surface openings; a valve body base comprising a block having formed in a normally upper surface thereof an axially extended recess congruent with the valve body and of a depth slightly greater than the height of the valve body, the recess having walls defining a longitudinally distributed series of inlets registered with respective valve body ports; a longitudinally extended generally U-shaped groove free of undulations along its length and defining a common passage juxtaposed to the surface openings across intervening lands defined by the upper surface of the valve body block; a locally deflectable synthetic organic polymeric diaphragm atop the sealing surface intersecting the plane of the valve body base upper surface in groove and surface opening sealing relation; a separable valve body cover perimetrically fastened to the valve body base in valve diaphragm compressing relation to fluid tightly cover the seal surface, the cover being locally relieved opposite the openings to receive a local portion of the diaphragm deflected thereinto by fluid pressure thereon, and valve control means comprising a series of solenoid operated plungers mounted on the cover to block entry of the diaphragm thereinto in fluid flow controlling relation to the common passage from the separate passages.

THE DRAWINGS

The invention will be further described as to an illustrative embodiment in conjunction with the attached drawings in which.

PREFERRED MODES

Figure 1:
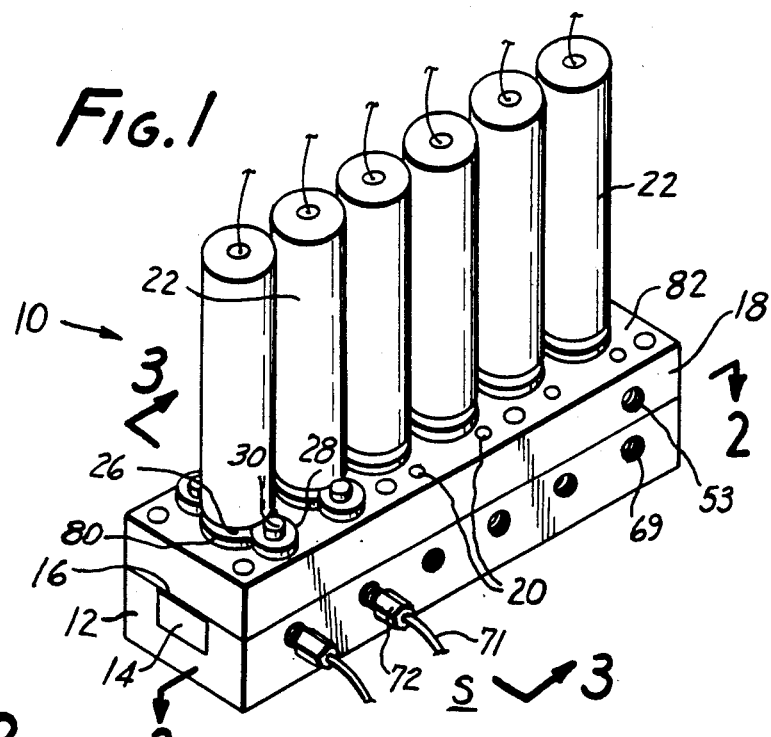
FIG. 1 is a perspective view of the present valve apparatus.

It is a signal advantage of the present valve apparatus structure that the common passage in the valve body has the form of a continuously upwardly open, longitudinally extended groove in the sealing surface of the valve body. This feature enables easy fabrication of the common passage by a single routing, in contrast with a common passage made up of a multiplicity of angularly drilled, sawtooth-undulating passage sections which connect with each other at an oblique angle below the sealing surface, and intersect the sealing surface at longitudinally spaced locations in registry with the fluid supply surface openings with which they are communicated by valve action. Such angled passage sections, as taught in the Wittman-Liebold U.S. Pat. No. 4,008,736, heretofore have been thought necessary for effective sealing while achieving full evacuation of the valve chambers are only laboriously realized in production, are prone to manufacturing error, are thus costly, and as the present apparatus demonstrates, unnecesary.

The invention apparatus further features a unitary longitudinally extended, but locally deflectable valve diaphragm which at once overlies all of the common passage groove and the surface openings with which the groove is periodically communicated.

With reference to the accompanying drawings, and particularly to FIGS. 1 to 5 and 7, the valve apparatus is shown at 10 and comprises a valve body base 12, a valve body 14 supported thereby, a valve diaphragm 16 atop the valve body, a body cover 18 surmounting the base and fluid tightly covering the valve body and its valve diaphragm, secured by a perimetrically disposed series of fasteners 20 threaded into the base, and a longitudinal series of solenoid operated valve actuators 22 partly inserted through the cover, sealed by O-rings 24, and mounted by the cooperation of actuator annular recesses 26 and cam elements 28 rotating on bolts 30, the latter for rapid mounting and dismounting of the solenoids from the valve apparatus as will be more particularly described.

Figure 2:
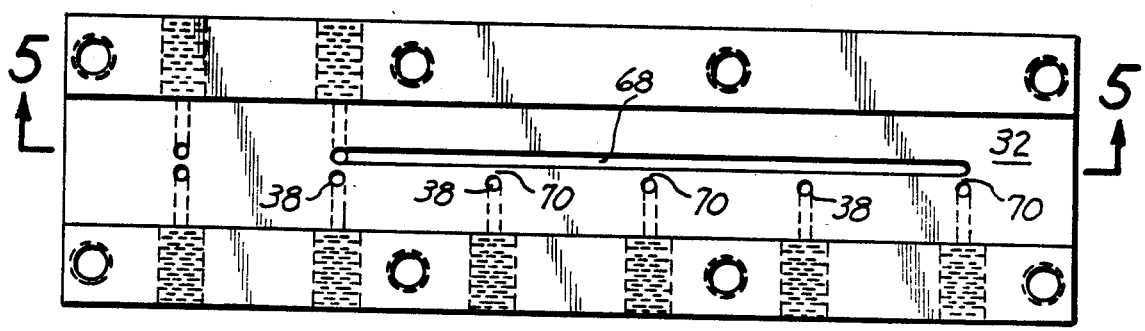
FIG. 2 is a horizontal sectional view thereof taken on line 2—2 in FIG. 1.

The valve body 14 is rectangular in longitudinal and transverse cross-section and defines a valve seat in the form of a rectangular sealing surface 32, best shown in FIG. 2. The valve body 14 is suitably fabricated of inert synthetic organic plastic which is dimensionally stable under reaction conditions, and machinable, such as Kel-F ®, a polytrifluorochloroethylene.

A series of right angled separate passages 34 lead through the valve body 14 from respective ports 36 in a vertically disposed side of the valve body 14 to respective local openings 38 in the normally upper, horizontally disposed side of the valve body, defining sealing surface 32. The separate passages 34 are readily drilled into the valve body from the sides to the center. Local openings 38 it will be noted are truly circular in cross section at the plane of the valve body 14, unlike sawtooth passage openings which intersect the valve body surface 32 at an angle and are elliptical therefore in cross-section at the plane of intersection. This assymetric opening shape is more difficult to seal, and causes undue wear on flexible diaphragms coming into repeated contact therewith for repetitive sealing operations.

The valve base 12 comprises a rectangular block 40 suitably fabricated of aluminum or stainless steel in which there is rectangularly formed a deep recess 22a sized to snugly receive the valve body 14. The depth of recess 42 is greater than the height of valve body 14, so that reposing the valve body in the recess leaves a shallow recess 44 into which the valve diaphragm 16 fits in a manner to be engaged by the cover 18, as shown.

The valve body cover 18 comprises a rectangular block 46, suitably fabricated of aluminum or stainless steel, generally congruent with the valve body 14, and corner registerable with the block 40 of the base 12. The cover block 46 defines a longitudinal series of stepped bores 48, spaced to oppose sealing surface openings 38. As noted, solenoids 22 are mounted on the cover 18, i.e. at bores 48 in valve body cover block 46, the bores defining an uppermost circular recess 50 receiving O-ring 24, an intermediate portion 52 journaling the lower end 54 of outer wall 56 of the solenoid 22, and a lowermost portion 58 which slidably journals the working tip 60 of solenoid operated plunger 62.

Figure 4:
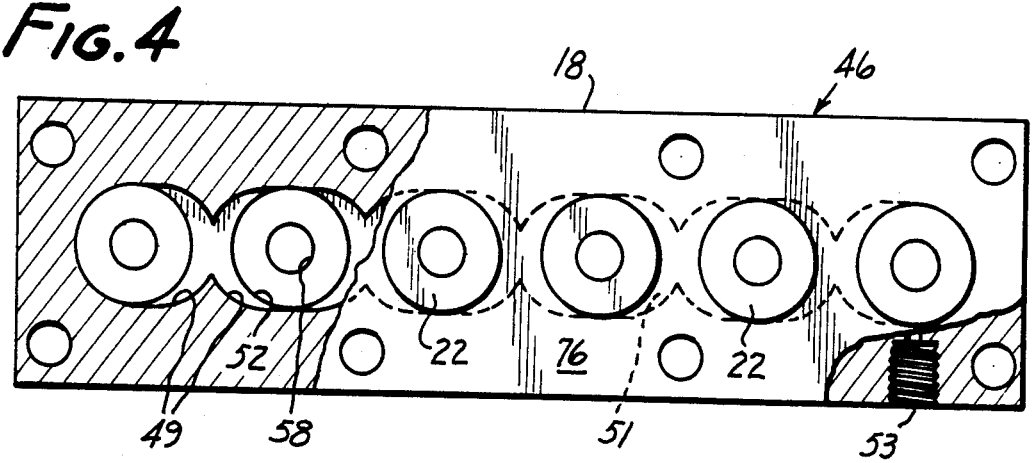
FIG. 4 is a further horizontal sectional view thereof in two planes, but generally taken on line 4—4 in FIG. 3.
Figure 5:
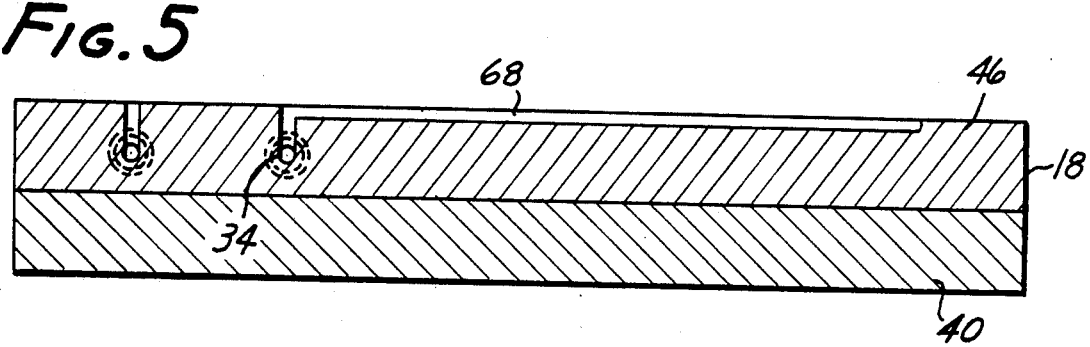
FIG. 5 is a further vertical sectional view thereof taken on line 5—5 in FIG. 2.

With particular reference to FIG. 4, a second set of bores 49 is provided overlapping each other and in a plane above the bottom of bores 48, defining a continuous passage 51 horizontally through the valve body cover 18. The passage 51 communicates with vacuum assist port 53 in the valve body cover for the purpose of applying a vacuum above the diaphragm 16 balancing vacuum applied below the diaphragm. The port 53 communicates with the reaction vessel beyond the valve and not shown. Application of vacuum in the manner described is useful when the valve of the invention is connected in line of very low pressure fluid, or when it is used to regulate the application of vacuum through a fluid conduit. In such cases, the diaphragm otherwise would not be urged away from the valving surface to fully open the valve.

A return spring 64 engaged between Circlip 66 and solenoid outer wall lower end 54, urges the plunger tip outward from the solenoid into bore portion 58 to bear against the diaphragm 16 in surface opening 38 sealing relation. Actuation of the solenoid 22 retracts the plunger and is used to open the valve opening 38 associated with a particular plunger as explained hereinbelow in connection with FIG. 6.

Figure 7:
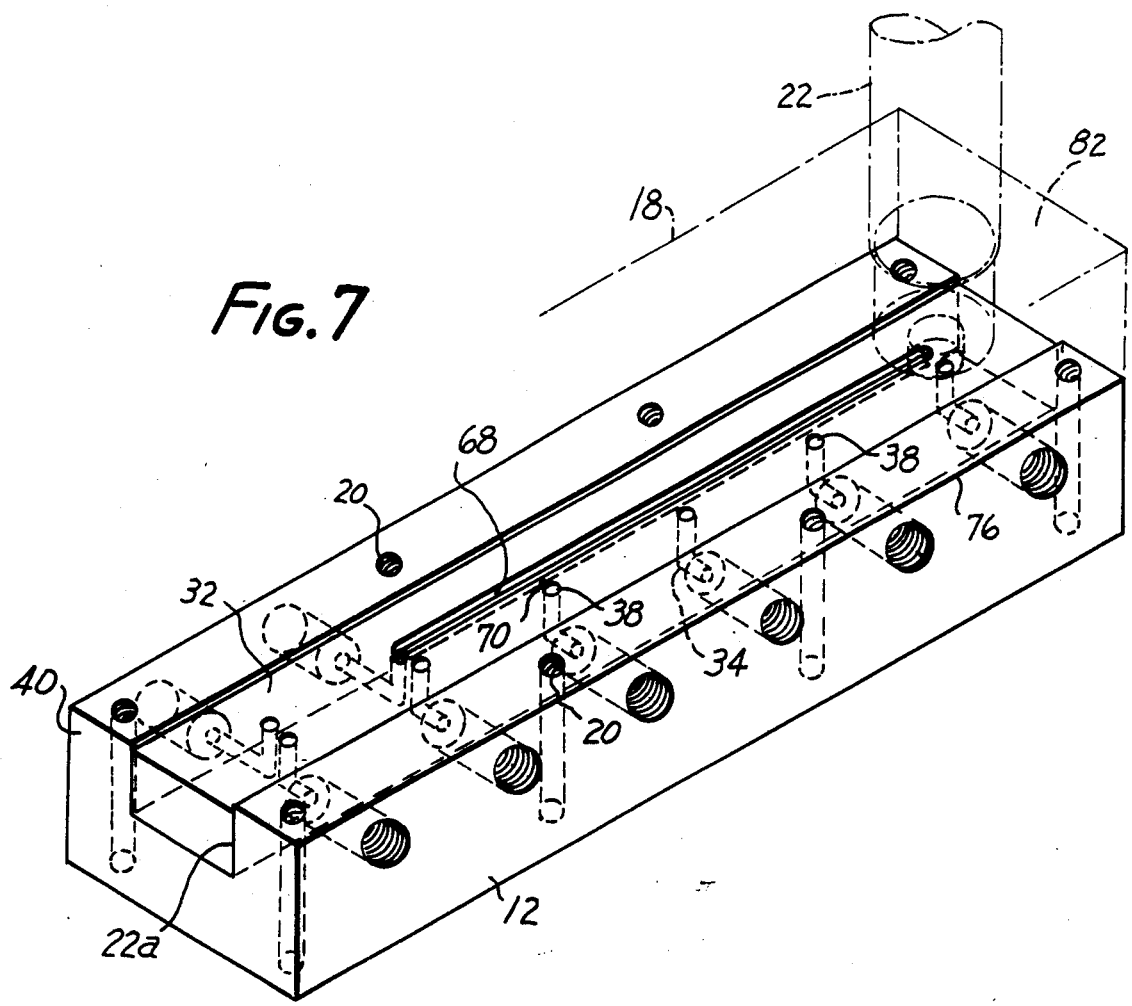

With reference particularly to FIGS. 2, 4 and 7, the valve body 14 has in addition to inlet ports 36, separate passages 34, and surface openings 38, a longitudinal groove 68 juxtaposed to the surface openings 38 across intervening lands 70, the lands defining a sealing surface between the openings and the groove. It will be readily apparent that simple routing of the valve body can be used to fashion the groove 68, it being U-shaped, continuously upwardly open and free of saw-tooth undulations and periodic intersection with the sealing surface 32, unlike other common passage systems which use angularly related segments to define a common passage, e.g. U.S. Pat. No. 4,008,736.

It is noteworthy too that the cross-section of the groove 68 is full throughout its length, and not partially blocked as happens when the common passage is made up of angularly related, intersecting segments. There at the intersections, the sharp radius below the sealing surface is actually spaced less than the diameter of the passage from the sealing surface, causing a "bottleneck" in the passage, owing to the intersection of two cylindrical passages. For example a nominal 0.020 passage may have a clearance beneath the seal of only 0.014 at each of the valved areas.

Sealing of the groove 68 and surface openings 38 is accomplished by the unitary, longitudinal valve diaphragm 16 reposed in the shallow recess 44 as noted. The diaphragm 16 is fabricated of material sufficiently flexible to be locally deflectable responsive to fluid pressure in a separate passage 34, and otherwise nonresponsive along the remainder of its length, chemically inert, dimensionally stable under operating conditions, and tough so as not to unduly rapidly fatigue from repeated flexings. Valve diaphragms of Kel-rez ®, a perfluoroethylene elastomer, or other suitable synthetic organic polymeric material can be used. It is an advantage of the present valve apparatus, derived from the use of a common passage groove that seal material, e.g. diaphragm wear is reduced by virtue of the distribution of sealing force across the lands 70 in preference to the immediate edge of the openings e.g. 38, or the edge of groove 30, which edges would otherwise tend to more rapidly wear the seal material.

In this connection it may be noted that where the common passage is made up of intersecting angled passages, the radius at their intersection is sharp and thus likely to be weak and easily broken down.

Figure 3:
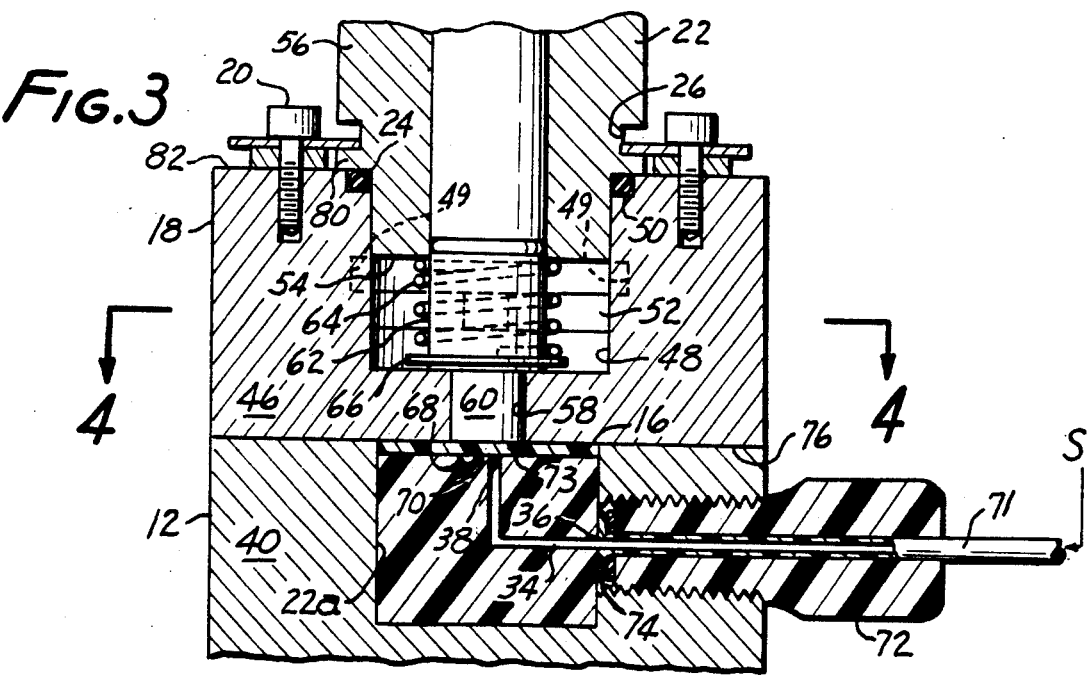
FIG. 3 is a vertical sectional view thereof taken on line 3—3 in FIG. 1, the valve being in closed condition.
Figure 6:
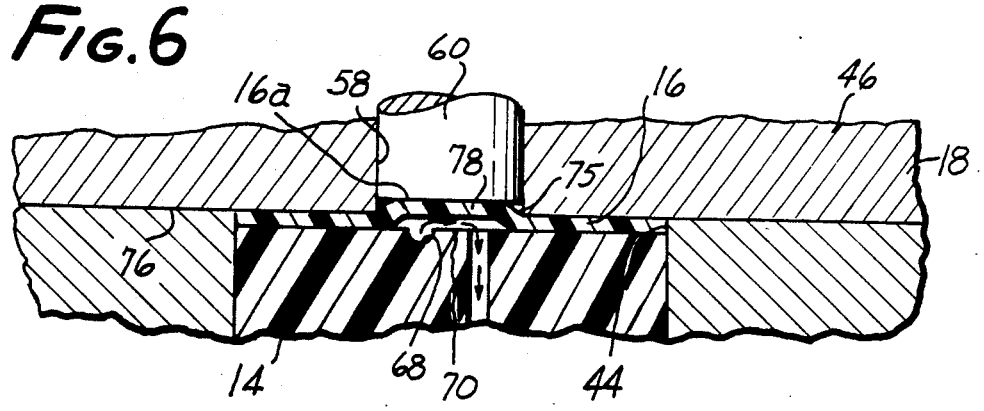
FIG. 6 is a fragmentary view in vertical section of the valve, the valve being in opened condition; and, FIG. 7 is a perspective view of the valve apparatus, with the cover removed.

The diameter of plunger tip 60 is such that the locus of the surface opening 38 therebeyond and the land 70 intermediate the opening 38 and the adjacent portion of the groove 68 is opposed to the tip. With reference to FIGS. 3 and 6, the tip 60 normally extended and engaged with the diaphragm 16 maintains a seal at 73 (FIG. 3), but upon actuation of the solenoid 22, the plunger 62 retracts against the resilient force of spring 64. Fluid in separate passage 34, under pressure from a supply S, entering through tubing 71 in threaded fitting 72 and coupling 74 in valve body block 40, lifts the diaphragm 16 locally at the surface opening 38 where a relief 75 has been defined in the undersurface 76 of the valve cover block 46. The localized lifting of the diaphragm 16 at 78 (FIG. 6) disengages the diaphragm 16 from the land 70 thereopposite and permits fluid flow into the groove 68 across the land 70. Except for the localized distortion under fluid pressure in the diaphragm 16 where the solenoid plunger tip 60 has been retracted, the diaphragm is in sealing contact throughout the length of juxtaposition of groove 68 and the series of surface openings 38.

In operation, two or more of the separate passages 34 are connected to different fluid supplies such as reagents to be used in a predetermined sequence. The solenoids are caused to retract their tips 60 in a sequence corresponding to the desired sequence of fluid delivery to a common passage formed by the groove 68. From the groove 68 the fluids pass to a reaction vessel or other common receiver which is not shown.

It will be noted that the valve diaphragm 16 positively excludes unevacuated spaces by defining a zero volume valve chamber beyond the surface opening 38, thus contributing to the efficiency of the valve, and blocking untoward reactions from inadvertent mixing of reagents or stale supplies.

The common passage defined by groove 68 is readily evacuated by suitable application of a negative pressure at fitting 69 communicating with the reaction vessel not shown, and operating the controlling actuator 22 thereabove, shown in phantom in FIG. 7.

A further feature of the apparatus is the mounting for the solenoids. It is desirable to have the solenoids as close as possible to the valve rather than to operate at a distance. Mounting of the solenoids on the valve cover achieves optimum proximity, and with the mounting feature now to be described is easily accommodated. With reference to FIGS. 1 and 3, the outer wall 56 of each solenoid 22 is provided in its lower portion with an annular recess 26. A pair of cam elements 28, typically discs eccentrically mounted on bolts 30 are set at 180° to each other across the solenoid wall 56. The bolts 30 are rotated to carry the cam elements angularly, opening a space for insertion of the solenoid 22, which is seated by its annular shoulder 80 on the top 82 of valve body cover 18. After the solenoid 22 is positioned, the bolts 30 are rerotated arraying the cam elements into camming engagement with the recess 26 wall. Continued rotation of bolts 30 tightly secures the solenoid 22 to the valve body cover 18. Disassembly is equally simple and rapid.

I claim:

1. Valve apparatus for the sequential delivery of different fluids from a plurality of different fluid sources through a common passage to a predetermined destination such as a common vessel, said apparatus comprising a valve body having a valve seat-defining surface, and a separable valve body cover adapted to fluid tightly cover said surface; a plurality of separate passages through said valve body each communicating a valve body port beyond said valve seat surface with a local opening in said surface for delivery thereof of fluid from one of said different fluid sources; a groove in said valve seat surface extending longitudinally in said valve body to define said common passage, said groove being continuously upwardly open toward said valve cover in juxtaposed relation with each said valve seat surface opening across a respective intervening land; means controlling flow of fluid into said common passage from said separate passages, said fluid flow control means including a valve between said valve body and cover adapted to cooperate with said intervening lands in locally actuated relation to block or unblock flow from any or all of said separate passages to said common passage in any predetermined timed relation corresponding to a desired sequence of delivery of different fluids through said common passage, means providing positive fluid pressure within a plurality of said separate passages tending to locally unseat said valve for fluid flow locally from one of said separate passages to said common passage, individually actuable valve control means acting against said valve in local unseating blocking relation, the sequence of actuation of said valve control means determining the sequence of fluid flows to said common passage when a plurality of said separate passages are under positive fluid pressure, each of said valve control means comprising a solenoid operate plunger operative to seat said valve between a given separate passage and said common passage in seal maintaining relation against positive fluid pressure in said separate passage, said solenoid being carried by said cover and comprising a cylindrical body having an outer wall, and means securing said solenoid body to said cover in rapidly removable relation, said means comprising a cam element and cooperating structure on the solenoid body outer wall.

2. The apparatus according to claim 1, including also a fluid source supply to one or more of said valve body ports.

3. The apparatus according to claim 1, in which said valve body defines a rectangular sealing surface, and said valve body cover is generally congruent with and overlies said sealing surface, and including also a valve body base supporting said valve body, said base defining a plurality of inlets in registry with said valve body ports, and a series of perimetrically distributed fasteners fastening said cover to said base in valve body sealing relation.

4. The apparatus according to claim 1, in which said separate passages are respectively adapted to pass liquid or gas inert or active fluids from a series of ports in one side of said valve body to said openings in a second side of said valve body relatively angularly disposed to said first side and defining said sealing surface.

5. The apparatus according to claim 1, including also means providing positive fluid pressure within a plurality of said separate passages tending to locally unseat said valve for fluid flow locally from one of said separate passages to said common passage, and including also individually actuable valve control means acting against said valve in local unseating blocking relation, the sequence of actuation of said valve control means determining the sequence of fluid flows to said common passage when a plurality of said separate passages are under positive fluid pressure.

6. The apparatus according to claim 1, in which each said valve control means comprises a solenoid operated plunger operative to seat said valve between a given separate passage and said common passage in seal maintaining relation against positive fluid pressure in said separate passage.

7. The apparatus according to claim 1, in whcih said valve comprises a unitary diaphragm overlying said groove and a plurality of said surface openings.

8. The apparatus according to claim 7, including also a plurality of valve control means paired respectively with said plurality of surface openings, said valve diaphragm being locally responsive to individual ones of said valve control means in particular surface opening blocking and unblocking controlling relation and independently of the blocked or unblocked condition of others of said surface openings.

9. The apparatus according to claim 1, in which said valve body is generally rectangular and has a planar valve seat-defining surface.

10. The apparatus according to claim 9, in which said sealing surface groove is free of surface-intersecting undulations throughout its juxtaposed length with said surface openings.

11. The apparatus according to claim 1, in which said sealing surface groove is free of surface-intersecting undulations throughout its juxtaposed length with said surface openings.

12. The apparatus according to claim 11, including also a valve body base comprising a block having a deep central recess adapted to snugly receive said valve body in shallow recess-defining relation, said base block defining a plurality of inlets to said valve body ports.

13. The apparatus according to claim 12, including also a valve diaphragm adapted to fill said shallow recess in simultaneous common passage and separate passage opening overlying relation.

14. The apparatus according to claim 13, in which said cover is fastened to said base and blocked against said valve diaphragm, said cover being locally relieved opposite said surface openings in diaphragm-deflection permitting relation.

15. The apparatus according to claim 14, including also a plurality of solenoid operated plungers independently operatively associated with said cover to control displacement of said valve diaphragm into the locally relieved portions of said cover, whereby fluid flow from a sealing surface opening past said valve diaphragm to said common passage is locally blocked or unblocked by separate operation of each said solenoid plunger in fluid flow sequence defining relation responsive to control of deflection of said diaphragm with respect to locally relieved portions of said cover.

16. The apparatus according to claim 15, including also a pressurized fluid source supply to one or more of said valve body ports, whereby said ports are continuously hydraulically full.

17. The apparatus according to claim 16, in which said valve body is generally rectangular in longitudinal and transverse cross section, said sealing surface is rectangular, said valve body cover is generally congruent with and overlies said sealing surface, said valve body base supports said valve body and including also a series of perimetrically distributed fasteners fastening said cover to said base in valve body sealing relation.

18. The apparatus according to claim 17, in which said separate passages are respectively adapted to pass liquid or gas inert or active fluids from a series of said ports in one normally vertical side of said valve body to said openings in the normally upper horizontal side of said valve body.

19. The apparatus according to claim 18, in which said pressurized fluid supply provides positive fluid pressure within said separate passages tending to locally unseat said valve diaphragm, each said solenoid plunger associated with a separate passage opening normally blocking displacement of said diaphragm local portion against said fluid supply pressure at said separate passage opening.

20. The apparatus according to claim 19, in which said solenoid plungers define individually actuable valve control means acting against said valve diaphragm in local unseating blocking relation, the sequence of actuation of said valve control means solely determining the sequence of fluid flows to said common passage when a plurality of said separate passages are under positive fluid pressure.

21. The apparatus according to claim 20, including also means to purge said common passage of fluids including an inert fluid valve body inlet and outlet communicated by said common passage.

22. Valve apparatus for the sequential delivery of different fluids from a plurality of different fluid sources through a common passage to a predetermined destination such as a common vessel, said apparatus comprising a valve body having a valve seat-defining surface, and a separable valve body cover adapted to fluid tightly cover said surface; a plurality of separate passages through said valve body each communicating a valve body port beyond said valve seat surface with a local opening in said surface for delivery thereof of fluid from one of said different fluid sources; a groove in said valve seat surface extending longitudinally in said valve body to define said common passage, said groove being continuously upwardly open toward said valve cover in juxtaposed relation with each said valve seat surface opening across a respective intervening land; means controlling flow of fluid into said common passage from said separate passages, said fluid flow control means including a valve between said valve body and cover adapted to cooperate with said intervening lands in locally actuated relation to block or unblock flow from any or all of said separate passages to said common passage in any predetermined timed relation corresponding to a desired sequence of delivery of different fluids through said common passage, means providing positive fluid pressure within a plurality of said separate passages tending to locally unseat said valve for fluid flow locally from one of said separate passages to said common passage, individually actuable valve control means determining the sequence of fluid flows to said common passage when a plurality of said separate passages are under positive fluid pressure, each of said valve control means comprising a solenoid operated valve between a given separate passage and said common passage in seal maintaining relation against positive fluid pressure in said separate passage, said solenoid being carried by said cover and comprising a cylindrical body having an outer wall, and cooperating structure on said solenoid body outer wall and said cover camming said solenoid body to said cover in rapidly removable relation.

* * * * *